United States Patent [19]
Clark et al.

[11] Patent Number: 5,425,279
[45] Date of Patent: Jun. 20, 1995

[54] VESSEL INSPECTION SYSTEM

[75] Inventors: Richard D. Clark; Daryl K. Rutt; John D. Stratton, all of Ontario, Canada; Thomas M. Robins; Daniel L. Torres, both of Bellingham, Wash.

[73] Assignee: Atlantic Richfield Company, Plano, Tex.

[21] Appl. No.: 125,960

[22] Filed: Sep. 23, 1993

[51] Int. Cl.⁶ .............................................. G01M 19/00
[52] U.S. Cl. ................................................... 73/865.8
[58] Field of Search .............. 73/623, 865.8; 356/376, 356/378, 384, 428; 348/82–85; 376/248, 249

[56] References Cited

U.S. PATENT DOCUMENTS

| | | | |
|---|---|---|---|
| 3,780,571 | 12/1973 | Wiesener | 376/249 |
| 3,809,607 | 5/1974 | Murray et al. | 376/249 |
| 4,107,244 | 8/1978 | Ochiai et al. | 73/623 |
| 4,169,758 | 10/1979 | Blackstone et al. | 348/83 |
| 4,302,772 | 11/1981 | Gillot | 348/82 |
| 4,331,975 | 5/1982 | Krawza et al. | 348/85 |
| 4,964,059 | 10/1990 | Sugaya et al. | 73/623 |
| 5,068,720 | 11/1991 | Herlitz et al. | 348/82 |

*Primary Examiner*—Robert Raevis
*Attorney, Agent, or Firm*—Michael E. Martin

[57] ABSTRACT

Petroleum coking drums and other vessels may be inspected to determine if dimensional changes or bulges have occurred in the surface of the vessel by an inspection device including a reflected laser light measuring survey apparatus and a video camera mounted on a frame which may be disposed in selected vertical positions along a central axis of the vessel and rotatably positioned by a rotary positioner interposed between a support stem for the device and the frame. Plural distance measurements and video scans are transmitted to a remote control console for recording and plotting of the contours of bulges or other dimensional anomalies surveyed by the survey apparatus. Components of the device are sealed or gas pressurized to minimize the chance of explosion in hazardous environments such as the interior of a petroleum coking drum. The system is adapted to be supported on the distal end of a coking drum drillstem and centralized by a removable clamp unit mounted on the drum manway flange. Data regarding the positions of the measured points may be converted for display using a CAD computer program to illustrate bulge contours and peaks indicative of unusual stress or degradation of the vessel structure.

7 Claims, 3 Drawing Sheets

VESSEL INSPECTION SYSTEM

BACKGROUND OF THE INVENTION

1. Field of the Invention

The present invention pertains to an inspection system for the internal surfaces of enclosed vessels, particularly coke drums and the like, wherein a combination of a distance measuring survey instrument and video camera are cooperatively operated to inspect the internal surfaces of the vessel for deterioration and distortion.

2. Background

Many enclosed vessels require, or desirably should undergo, periodic inspection to detect structural anomalies or other conditions which may eventually lead to vessel structural deterioration or failure. For example, it is desirable to frequently inspect the interior surfaces of vessels known as coke drums used in petroleum coking operations to determine if bulging or distortion of the drum surfaces has occurred and/or if other and visual signs of deterioration are present. Vessels such as petroleum coking drums may be on the order of twenty feet to thirty feet in diameter and fifty feet to seventy feet in height. These vessels are subjected to thermal and mechanical stresses which, without periodic monitoring, can lead to early and unexpected structural failure. One problem encountered in inspecting petroleum coke drums and similar vessels pertains to the fact that the exterior surfaces of these vessels are clad with an insulating blanket or other protective structure which prohibits easy visual inspection of bulges or similar distortions in the drum structure. Such bulges are usually indicators of structural deterioration of the drum.

Heretofore, for example, petroleum coke drums have been inspected by emptying coke from the drum, thoroughly washing and purging of the drum interior space and erecting a scaffolding in the interior of the drum so that inspection personnel may make essentially manual dimensional measurements to detect changes in shape of the drum structure, such as bulges in the cylindrical surface, which would indicate a weakness in the drum and possible early failure. Clearly, the time, expense and hazards associated with this type of inspection procedure are such as to bring forth the realization of a need to improve the inspection process. Similar types of vessels which are required or are desirably inspected from the interior should also benefit from a solution to the abovementioned problem.

SUMMARY OF THE INVENTION

The present invention provides a unique inspection system and method for visually and dimensionally inspecting the interior surfaces of a vessel, including a closable vessel such as a petroleum coking drum.

In accordance with an important aspect of the present invention, a vessel inspection system is provided which includes a device insertable into the interior of a vessel in a stand-off position from the vessel wall surfaces and wherein the inspection system includes a remotely disposed distance measuring or range measuring apparatus and a visual inspection apparatus, such as a video camera. The vessel inspection device includes a support frame which may be rotated to provide for scanning the entire interior circumference of a vessel. Certain surfaces which are not normal to a central axis of the vessel may also be visually inspected by the video camera which may be panned and tilted to cover the entire interior surface of the vessel.

The inspection system of the present invention is adapted to minimize the chance of igniting hazardous vapors which may be present in the interior of a vessel and the system may be operated remotely, thereby eliminating the requirement to place operating personnel within the vessel. In a preferred embodiment, the inspection device is adapted to be disposed on a drillstem, which may be moved generally vertically within the vessel by a conventional hoisting apparatus, and which is normally used to inject high-pressure water into the interior of the vessel for cutting and drilling material disposed in the vessel. A detailed description is provided herein of an embodiment of the invention adapted for generally vertical movement within a petroleum coking drum. However, those skilled in the art will recognize that the system and method may be used to inspect vessel interiors extending horizontally or at other angles. Moreover, the term vessel as used herein may include structures such as pipe as well as other containers which are not necessarily of a geometry the same as described in detail below.

In accordance with another important aspect, the present invention provides an improved method for inspecting the interior of a substantially closed vessel by remote control wherein a video scan of the interior of the vessel and a bulge measurement scan of the interior of the vessel may be carried out and recorded, respectively, and coordinated to provide an improved inspection process. In particular, the bulge measurement or dimensional measurement process is adapted to produce a video display or printed record of bulges or distortion in the vessel surfaces with respect to dimensional reference points such as weld seams and other suitable reference points. In accordance with the present invention, the results of each inspection may be compared with previous inspections to determine changes in bulge or surface distortion patterns which might be indicative of the useful life of the vessel.

Those skilled in the art will recognize the above-described advantages and features of the invention together with other superior aspects thereof upon reading the detailed description which follows in conjunction with the drawing.

DESCRIPTION OF PREFERRED EMBODIMENTS

Figure 1:
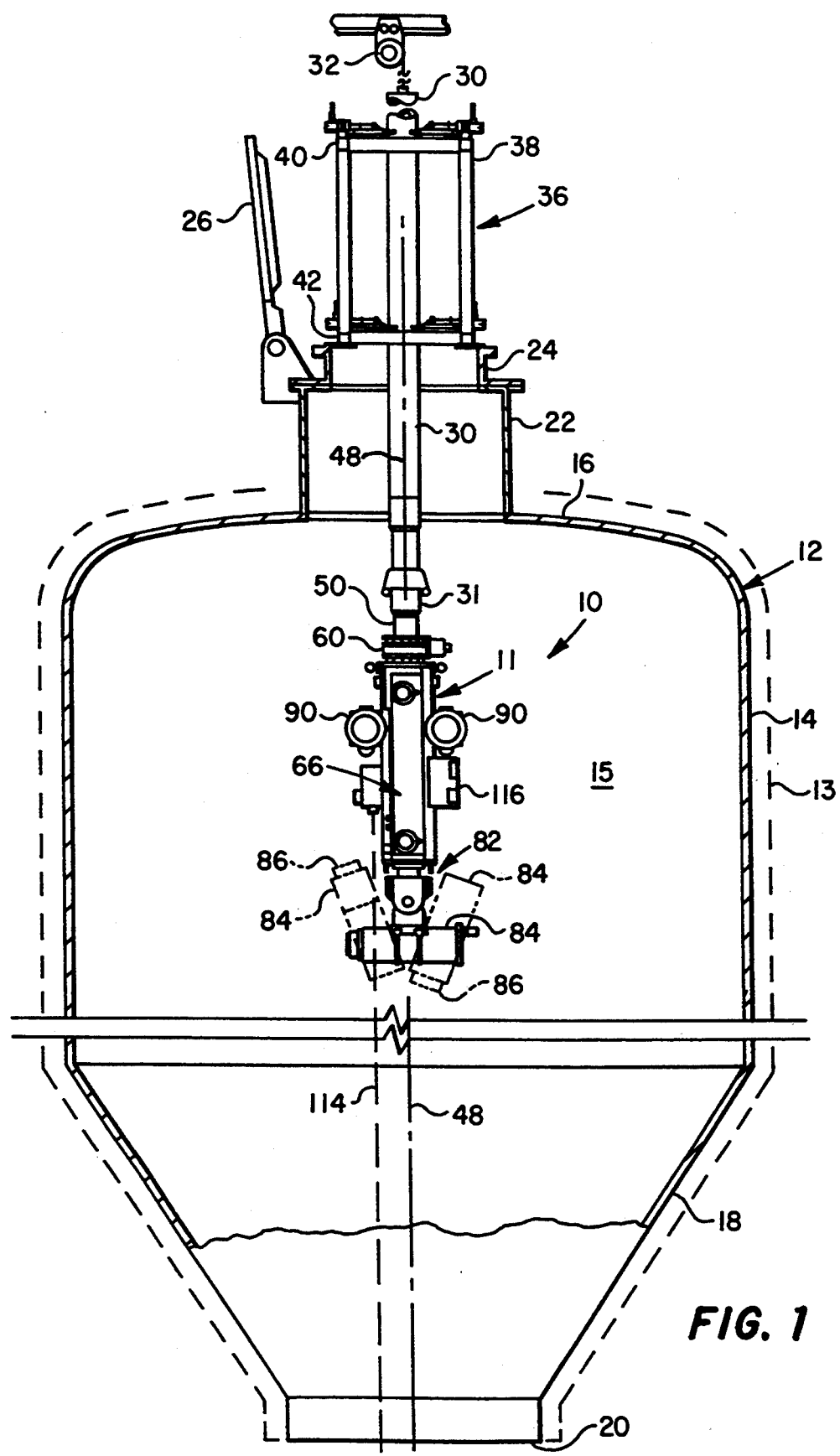
FIG. 1 is an elevation of the vessel inspection system shown in place for inspecting the interior of a vessel such as a petroleum coking drum.

In the description which follows, like parts are marked throughout the specification and drawing with the same reference numerals, respectively. The drawing figures are not necessarily to scale in the interest of clarity and conciseness.

Referring to FIG. 1, there is illustrated a major part of a vessel inspection system in accordance with the present invention and generally designated by the numeral 10. The inspection system 10 includes a unique inspection device 11 shown disposed within the interior of a closable vessel 12 characterized as a petroleum coking drum. The coking drum 12 is a generally cylindrical vessel having a cylindrical sidewall 14, a head 16 and a frustoconical lower distal end portion 18 terminating in a bottom discharge opening 20 which may be closed by a suitable cover, not shown. The head 16 includes a cylindrical hatch delimited by a coaming 22, a flange 24 and a hinged cover 26 shown in the open position. The vessel 12 is typically covered with an insulating blanket 13 over substantially its entire exterior surface.

FIG. 1 illustrates the inspection device 11 connected to an elongated stem 30 comprising a cylindrical pipe which extends into the interior of the vessel 12 through the manway or hatch coaming 22. The stem 30 is preferably suspended from a suitable motor operated hoist 32 disposed above the vessel 12 and operable to move the stem 30 from a raised position out of the interior 15 of the vessel to the position shown in FIG. 1 and to a further lowered position to allow the device 11 to inspect the entire interior surface of the vessel. In order to facilitate the use of the system 10 to make high-resolution video recordings of the interior surface of the vessel 12 and to make precise measurements of distortion or dimensional changes in the general shape of the vessel, it is important to stabilize and clamp the stem 30 during operation of the inspection device 11. In this regard, a unique stem clamp unit 36 is shown disposed on the flange 24, suitably secured thereto, and adapted to centralize and clamp the stem 30 during operation of the inspection system 10.

Figure 2:
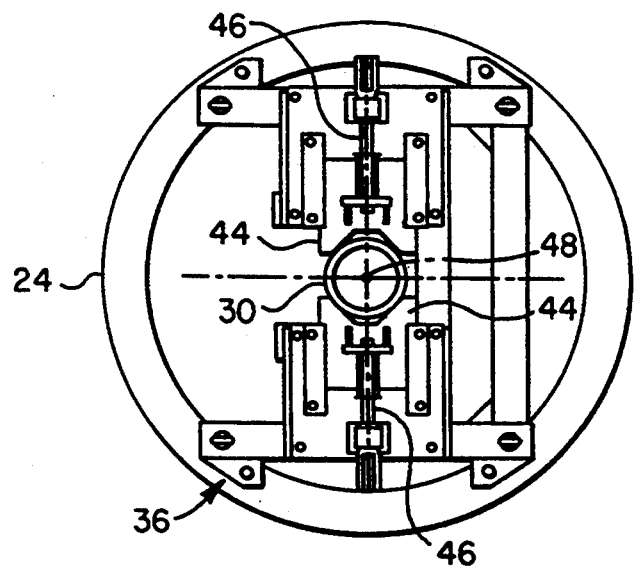
FIG. 2 is a plan view showing the stem clamp unit mounted on the drum top flange.

Referring to FIG. 2 also, the stem clamp unit 36 includes a generally rectangular frame 38 having vertically spaced apart members 40 and 42, each of which support opposed clamping jaws 44, as shown by way of example in FIG. 2. The frame members 40 and 42 are open to one side as shown in FIG. 2 to permit lateral insertion of the stem 30 within the frame 38. The stem clamping jaws 44 are operable to be biased in their stem clamping positions by suitable actuators 46 which may comprise power operated actuators or so-called toggle type actuators such as a type manufactured by Automation Products Group of Mt. Clemens, Mich. The actuators 46 are operable to cause the jaws 44 to releasably grip the stem 30 to centralize it along the central longitudinal axis 48 of the vessel 12 and to prevent lateral or vertical movement of the stem during operation of the inspection device 11. The stem 30 normally functions to carry a suitable coke drilling apparatus at its lower distal end 31 such as a high-pressure water jet type drill for cutting petroleum coke out of the interior 15 of the vessel 12 for discharge through the bottom opening 20. Accordingly, the inspection device 11 may be conveniently mounted on the distal end 31 of the stem 30 in place of the drilling means, not shown. In this regard, a suitable coupling section 50 is provided for the inspection device 11 for releasably coupling the device to the lower end of the stem 30 when an inspection procedure is to be carried out.

Petroleum coking drums, in particular, undergo severe thermally induced stress cycles during the process of producing petroleum coke and removing the coke from the interior of the drum. One method of monitoring the structural integrity of a coke drum is to inspect the interior surface for distortion or "bulging" of the cylindrical wall 14. Dimensional distortion or bulging is an indication of degradation of the vessel and dimensional verification or monitoring of the bulging may be used to predict when major repair or replacement of a coking drum is required. The process of inspecting a vessel such as a petroleum coking drum is complicated by the exterior insulation jacket or blanket 13 which precludes convenient inspection of the drum for detection of the inception or growth of bulging from the vessel exterior. Moreover, it is also advisable to make visual inspections of the interior surface of a vessel such as a petroleum coking drum to detect other anomalies such as the loss of surface cladding or deterioration of seam welds, etc.

Figure 3:
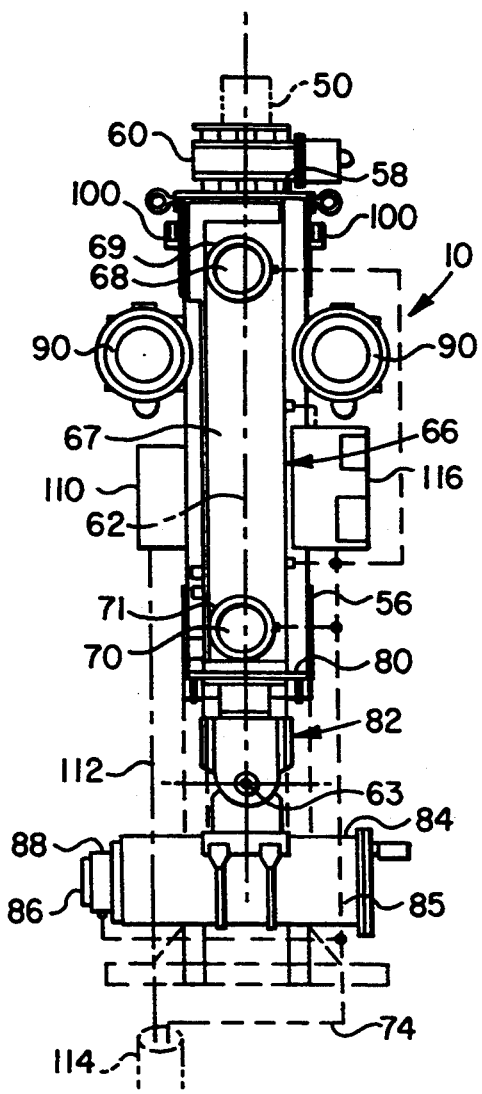
FIG. 3 is a front elevation of the inspection device of the system.
Figure 4:
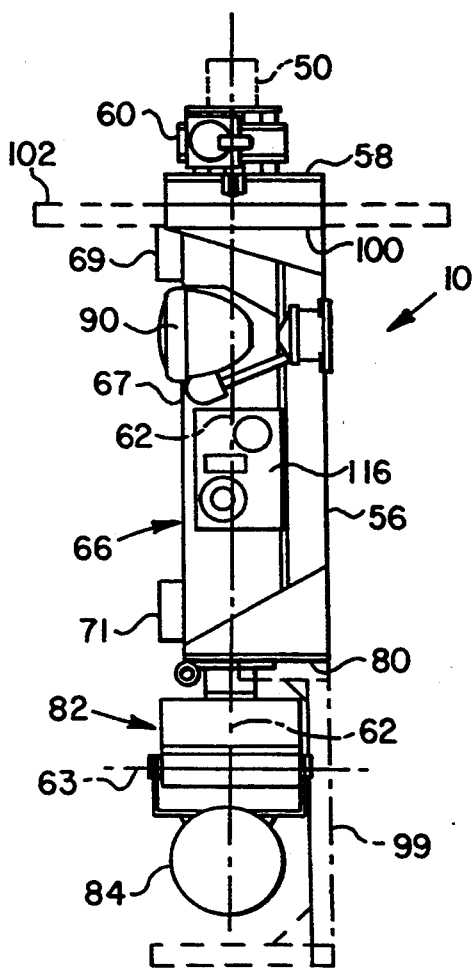
FIG. 4 is a side elevation of the inspection device.

Referring now to FIGS. 3 and 4, the inspection device 11 is further characterized by an elongated frame 56, including an upper transverse flange part 58, which is suitably connected to a motor operated rotary positioning mechanism 60. The rotary positioner 60 is also adapted to be connected to the coupling part 50 and is operable, upon command by remote control, to rotate the inspection device 11, including the frame 56, with respect to the coupling 50 about a central axis 62 which, in operation of the device 11, coincides with the axis 48. The rotary positioner 60 may be of a type commercially available such as a Model 10R180, manufactured by DCI of Franklin, Mass. The frame 56 also supports an inspection or survey apparatus, generally designated by the numeral 66, for measuring the distance between the axis 62 and the interior surface of the vessel section 14.

The apparatus 66 is of a type commercially available which utilizes a directable focused light or "laser" beam which is projected from a lens 68 against the interior surface of the wall section 14, which light beam is reflected back through a lens 70 and is viewed by a so-called triangulation camera disposed within an enclosure 67 of the apparatus 66. The apparatus 66 has internal circuitry adapted to measure the distance between a reference point on the apparatus and the surface from which the laser light beam is reflected back to the camera lens 70. The directable laser light beam may be adapted to cover a target surface area of about five feet by seven feet at a stand-off of about thirteen feet from the surface of the section 14, for example. The minimum spacing of distance measurements at the above-mentioned stand-off distance coordinates on a one inch by one inch grid, and distance measurement resolution is less than 0.125 inches at these conditions. Accordingly, the apparatus 66 is operable to measure slight bulges or deformities in the cylindrical section 14 of the vessel 12. The apparatus 66 may be of a type commercially available such as a Model 62LS Range Camera manufactured by Range Vision, Inc. of Burnaby, British Columbia. The apparatus 66 is equipped with the abovementioned suitable laser light source, triangulation camera and horizontal and vertical scanning drives for the laser light source. The apparatus 66 is also equipped with a suitable sensor to detect sensing head vibration which might interfere with the accuracy of the distance measuring capability of the apparatus. The enclosure 67 is modified to be gas pressurized to minimize the chance of explosion when the apparatus 66 is disposed in a potentially hazardous environment such as the interior 15 of the coking drum 12. The lenses 68 and 70 are also modified to provide for suitable gas curtains to flow thereover to prevent fouling of the lens surfaces. In this regard, the lenses 68 and 70 are provided with suitable ported shrouds 69 and 71 which are operable to receive a lens washing or curtain fluid such as an inert gas, or so-called instrument air, conducted to the device 11 from a conduit 74, FIG. 3. The lens washing or gas curtain devices, including the shrouds 69 and 71, may be of a type commercially available, such as a model PELCO E700A from Gullevin International of St. Laurent, Quebec.

The frame 56 includes a lower transverse flange 80 on which is mounted a motor operated positioning mechanism, generally designated by the numeral 82, for supporting and positioning a camera 84 having a viewing lens 86 also protected by an air curtain shroud 88, FIG. 3. The camera 84 is suitably mounted on the positioning mechanism 82 for positioning the camera lens 86 about the axis 62 and also about an axis 63 normal to the axis 62. Accordingly, the camera 84 may be panned about the axis 62 and tilted about the axis 63 to view the entire interior surface of the vessel 12, for example. The camera 84 is enclosed in an explosion-proof housing 85 and the air curtain shroud 88 is also in communication with the conduit 74 to receive lens washing gas therefrom. The camera 84 may be of a type operable to have a minimum resolution of 300 equivalent standard television lines and may be of a type commercially available such as a Model SSC-C370 12vDc manufactured by Sony Corporation of Park Ridge, N.J. The lens 86 may also be of a type commercially available such as a Model C-31002, manufactured by Cosmicar and having a "zoom" or magnification ratio of about 12 to 1 with remote control of zoom and focus. The positioner 82 is also of a type commercially available such as a Model PT1250 EX/PP, manufactured by Pelco of Clovis, Calif., having a pan range of at least plus or minus thirty degrees (±30°), a tilt range of at least seventy five degrees (75°) to minus fifteen degrees (−15°) from the horizonal with adjustable limit stops for both pan and tilt motions, a preset center position in both the pan and tilt drive modes with position feedback signals for both the pan and tilt positioning operations.

As shown in FIGS. 3 and 4, the device 11 also includes spaced apart generally horizontally projecting floodlights 90 which are operable to illuminate the interior surface of the vessel 12 for suitable viewing by the camera 84. The floodlights 90 may be of a type available from Cooper Industries, Inc., Houston, Tex., under the trademark Crouse Hinds as Model RCDE-6.

As also shown in FIGS. 3 and 4, the frame 56 may be mounted on a suitable rest support or stand 99 when servicing or repairing the device 11, and the frame 56 includes opposed support tubes 100 for receiving removable support beams 102, one shown in FIG. 4, whereby the device 11 may be temporarily supported on the flange 24, for example, to facilitate coupling and decoupling the device with respect to the stem 30. The support bars 102 may, of course, be removed from the support tubes 100 when it is desired to lower the device 11 into the interior 15 of the vessel 12. As shown in FIGS. 1 and 3, electrical control signals to and from the positioner 60, the apparatus 66, the positioning unit 82, the camera 84 and the floodlights 90 may be carried by suitable conductors, not shown, through a suitable junction enclosure 110 mounted on the frame 56 and then through a suitable bundled conductor 112 which may be disposed in a sleeve 114 together with the conduit 74. The multiconductor cable and sleeve assembly 114 may extend from the interior 15 of the vessel 12, for example, through the bottom opening 20 to a suitable control console to be described in further detail herein.

As shown in FIG. 3, instrument air or purge gas may be conducted to a suitable control unit 116 mounted on the frame 56 and operable to monitor the flow of purge gas to and from the enclosure 67 of the apparatus 66. The control unit 116 may also be of a type commercially available such as a Model 1001A, manufactured by BEBCO. Basically, the control unit 116 monitors the pressure within the interior of the enclosure 67 and operates a suitable alarm if that pressure decreases below a predetermined value indicating a possible leak of purge gas of unacceptable proportions from the enclosure 67.

Figure 5:
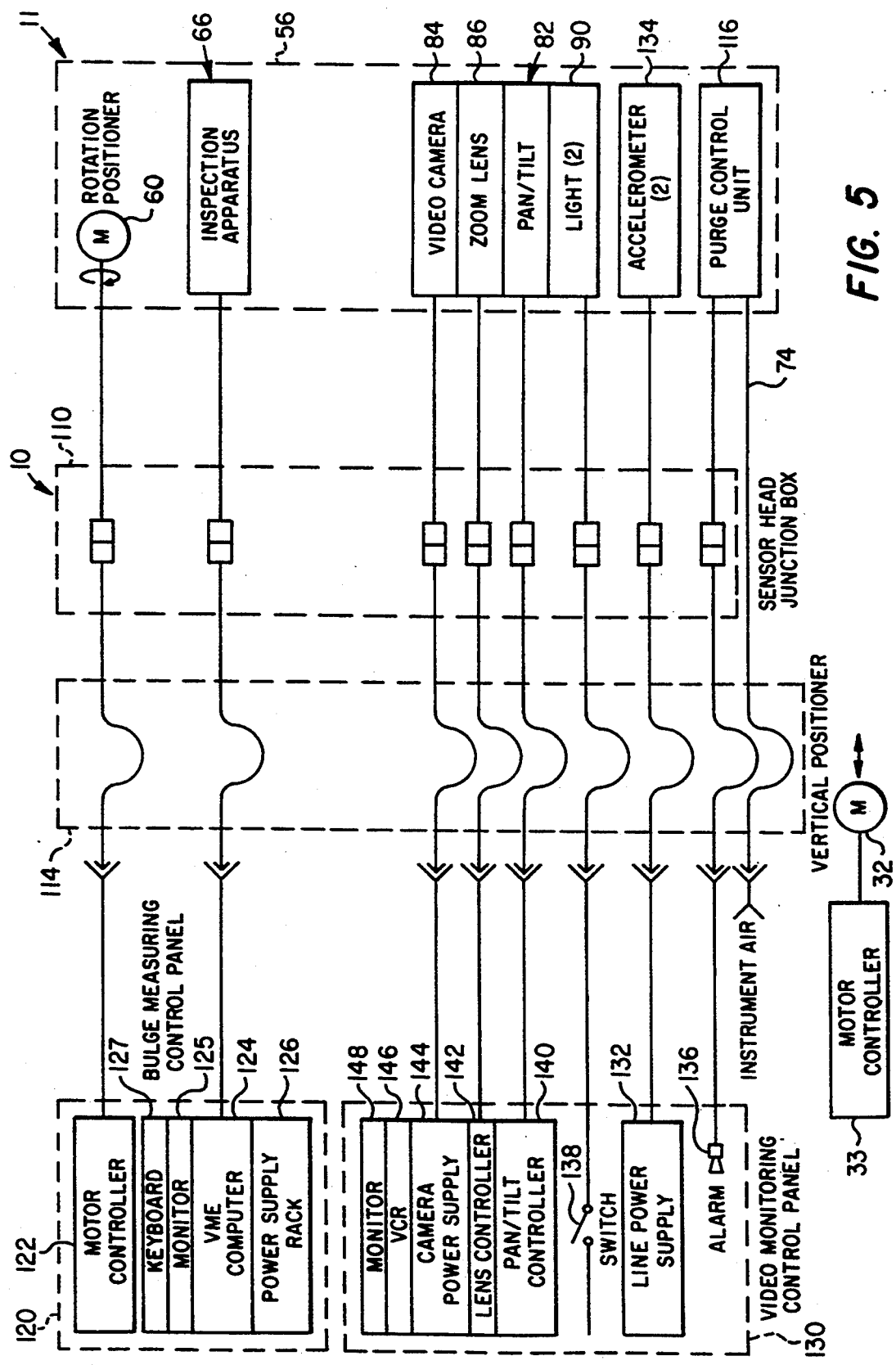
FIG. 5 is a schematic diagram of the major elements of the system.

Referring now to FIG. 5, there is illustrated a block diagram of the major components of the system 10 including those components which are disposed on the frame 56. As illustrated in FIG. 5, the vertical positioning hoist 32 is operable by a suitable controller 33 for positioning the stem 30 and the device 11. FIG. 5 also shows that the control console may be divided into two separate control panels, one for controlling the operation of the system 10 to make dimensional measurements or so-called bulge measurements of the section 14 of the vessel 12 and a separate control panel for operating the video camera 84. As illustrated in FIG. 5, a control panel 120 may be provided to include a controller 122 for operating the rotation motor of positioner 60 and a digital computer or central processing unit 124 for controlling the operation of the inspection or survey apparatus 66 and for receiving data from the apparatus 66 to provide data and a suitable visual display of the dimensional changes in the surface of the section 14o The control panel 120 also includes a rack mounted power supply unit 126 for supplying power to the apparatus 66. The power supply unit 126 is operable to supply electrical power to the processing unit 124 also.

The processing unit 124 may be of a type operable to run on MS DOS based software, such as a so-called IBM type compatible computer. The processing unit 124 is equipped with a suitable visual monitor 125 and keyboard 127 and is adapted to be programmed to calculate and store coordinate data received from the apparatus 66 and display related images on the monitor 125. The processing unit 124 is also adapted to allow operator control of the scanning area of the laser light beam as well as data point spacing in the horizontal and vertical or so-called x and y directions. Additional features include the ability to combine individual scenes of the surfaces measured into so-called ring and complete surface models. Data from the processing unit 124 may be processed off-line to overlay weld seam locations in accordance with vessel design, add particular information regarding identification of the vessel and produce suitable displays indicating a planar developed view of the vessel surface showing bulge contour lines and peaks as well as a three-dimensional view of the vessel with bulge areas shaded, for example.

Referring further to FIG. 5, the control console also includes a video monitoring control panel 130 which includes a power supply 132 for vibration sensing accelerometers 134 which are suitably mounted on the frame 56 to indicate if a vibration level exists during operation of the system 10 which is unacceptable for measuring with the apparatus 66. A suitable audio and/or visual alarm 136 is also provided on the panel 130 to indicate when a possible leak is occurring in the enclosure 67 of the apparatus 66. As illustrated, the panel 130 includes a suitable switch 138 for controlling the floodlights 90, a control unit 140 for the pan and tilt positioning unit 82 and a controller 142 for operating the zoom lens 86.

The camera 84 is operably connected to a suitable power supply 144, a video recorder 146 and a suitable video monitor 148, all at the panel 130.

An operation to inspect the interior of a vessel such as the drum 12 is preceded by removal of all material from the interior 15 of the vessel, opening the hatch cover 26 and providing access to the bottom opening 20. Preferably, the temperature within the interior 15 is reduced to about 100° F. and the stem 30 is raised to a point so that its lower distal end 31 is above the flange 24. Typically, the inspection device 11 is provided with the support bars 102 and is lowered into the opening in the flange 24 so that the support bars are resting on the flange. At this time the stem 30 is lowered and connected to the coupling 50. The control cable assembly 114 is connected to the device 11, lowered through the vessel 12 and out the bottom opening 20 for connection to an extension of the control cable leading to the control console which includes the panels 120 and 130.

At this time the stem 30 may, if not previously adapted, be provided with a suitable linear measurement scale or tape measure, for example, suitably connected to its exterior surface for reference of the vertical position of the device 11 once it is lowered into the interior 15. Alternatively, the hoist 32 may be provided with a suitable readout device to indicate linear movement of the stem 30. Once the control cable 114 is suitably connected to the device 11 and to the control console, the support bars 102 may be removed from the frame 56 and the device lowered into the interior 15 by lowering the stem 30 with the hoist 32. The position of the device 11 with respect to the flange 24 is noted for each vertical change in position of the device within the interior of the vessel 12.

When the device 11 has been lowered below the flange 24, the clamp unit 36 is installed on the flange with the clamping jaws 44 retracted so that they may be positioned around the stem 30. When the clamp unit 36 has been suitably secured to the vessel 12 and the device 11 positioned in an initial position for inspecting the interior of the vessel, the actuators 46 are operated to cause the jaws 44 to firmly grip the stem 30 holding it in a centralized position aligned with the axis 48.

Once the device 11 has been centralized and is ready for operation, an inert pressure gas or so-called instrument air is supplied through the conduit 74 to pressurize the enclosure 67 and to begin washing the lenses 68, 70 and 86. Proper pressurization of the enclosure 67 is verified through the control unit 116 by a lack of an alarm signal from the alarm 136. Verification of the operability of the positioners 60 and 82 together with the operability of the camera 84 and the survey apparatus 66 is also carried out. A calibration measurement may also be carried out on the apparatus 66 from a known reference point, if available.

Certain position sensors on the positioners 60 and 82 may be read to indicate the position of the device 11 including the apparatus 66 and the camera 84. The positioner 82 is also set to a "centered" position which will align the lens of the camera 84 with a "centered" position of the survey apparatus 66. If the device 11 is not vertically positioned in a location to begin a survey or inspection of the interior of the vessel 12, the clamps 46 are released and the hoist 32 is operated to vertically position the device in a starting position and the clamps 46 are then actuated to re-engage the jaws 44 firmly with the stem 30. The positioner 60 is then operated to rotate the device 11 to a starting position which may be from any reference point on the drum or vessel 12 such as a port, welded seam or other landmark. The starting vertical and rotary positions of the device 11 are then recorded as a "null" position.

At this point the floodlights 90 may be illuminated and an overall view of the interior surface of the vessel may be initiated by operation of the camera 84 using the positioner 82 and the lens controller 142 to cause the lens 86 to magnify an area of interest on the monitor 148. If a record of the magnified area is required, then the recorder 146 is operated to begin recording the output signal from the camera 84. Voice-over of the tape being recorded by the recorder 146 may be carried out to provide comments on features being recorded.

After video scanning and recording is conducted, the floodlights 90 are extinguished and the bulge measurement scan or survey is initiated. The vertical and rotary position of the survey apparatus 66 may be recorded on the processing unit 124 and a survey is then initiated by the apparatus 66 to scan and store the resulting measurement points in the processing unit 124. If further scenes at the vertical position of the system 10 are required, such as up to a full circumferential or "ring" scan, then the positioner 60 is operated to index the device 11 to rotate about the axes 48, 62 to a new position and the steps of performing the video scan and at least the bulge survey or measurement scan is repeated. Once all of the interior surface of the vessel 12 which can be covered at a predetermined vertical position of the device 11 is viewed, surveyed and recorded, the device 11 may be positioned at a new vertical position within the vessel and the above steps carried out until all of the interior surface area of the vessel is inspected or surveyed, as desired.

Upon completion of a survey of the vessel 12, the clamp assembly 36 is removed from the flange 24 and the stem 30 is raised to remove the device 11 from the interior 15 whereupon the support bars 102 are reinserted in the frame 56 and the support stand 99 is suitably attached to the bottom of the frame. The stem 30 is then returned to normal operation and the inspection system 10 is removed from the vicinity of the vessel 12, including the aforementioned control console and related components.

Since the processing unit 124 has stored data indicating the distances from the axis 48 of plural points on the interior surface of the section 14 of the drum, which points are preferably spaced about one inch apart on a rectangular grid, this data may be used to generate or be merged into a model or map of the entire interior surface of the drum section 14 which has been surveyed using previously logged vertical and rotary scene positions of the various areas inspected or surveyed by the apparatus 66. The scenes, ring scans or entire surface scans may be converted to a suitable data format which will enable the data to be used in conjunction with a commercially available computer-aided design computer program such as one designated by the trademark AUTOCAD. The data converted for use with the AUTOCAD program may be overlayed with data representing welded seams or other known anomalies of the vessel interior. The program may then be used to provide so-called layout views showing bulge contour lines or peaks as well as a three-dimensional view of the interior of the vessel 12 showing the bulge areas in a shaded form. The survey may be compared with previous surveys to determine changes in bulge patterns or the like.

Although a preferred embodiment of a vessel inspection or survey system, together with an improved method of carrying out an inspection or survey of the interior of a vessel has been described hereinabove, those skilled in the art will recognize that various substitutions and modifications may be made to the system and method described without departing from the scope and spirit of the invention as recited in the appended claims.

What is claimed is:

1. A vessel inspection system for surveying the interior surface of a vessel to determine dimensional changes in said vessel, said system including a device comprising:

a frame;

a survey apparatus mounted on said frame and operable to measure the distance between a reference point and said interior surface of said vessel and to transmit signals relating to said distance measurement;

a support for supporting said frame for movement within said vessel along an axis;

a positioner for positioning said frame and said apparatus rotationally with respect to said axis at a selected number of positions for measuring the distance from said reference point to said surface;

means for recording signals relating to the distances measured by said survey apparatus, the rotary position of said survey apparatus with respect to said vessel and the position of said survey apparatus along said axis within said vessel; said survey apparatus including a signal source operable to scan a predetermined area of said surface of said vessel and a triangulation camera operable to focus on said signal for determining the distance between said reference point and said surface of said vessel;

an enclosure for said survey apparatus and a source of pressure gas connected to said enclosure for pressurizing said enclosure to minimize incursion of combustible vapor into said enclosure, said survey apparatus including two spaced apart lenses, each of said lenses including a gas curtain shroud associated therewith and operably connected to said source of pressure gas for maintaining said lenses substantially free of foreign matter during operation of said apparatus;

a video camera supported on said frame and operably connected to at least one of a monitor and recording means for providing video scanning of said surface of said vessel;

a camera positioner supported on said frame and operable to position said video camera for viewing substantially all of the interior surface of said vessel by said video camera, said camera positioner being operable to position said video camera about two mutually perpendicular axes and wherein one of said axes coincides with said axis of said vessel during operation of said system;

floodlight means supported on said frame for illuminating said surface of said vessel for viewing by said video camera;

a clamp unit adapted to be supported on said vessel for clamping said support in a predetermined lateral and vertical position with respect to said axis of said vessel during operation of said system; and an accelerometer means supported on said frame and operable to sense vibrations of said apparatus, said accelerometer means being operably connected to signal generating means for generating an alarm signal indicative of excessive vibration of said device during operation of said survey apparatus.

2. A system for inspecting the interior of a vessel comprising:

a device insertable in said vessel including a frame, a survey apparatus mounted on said frame and operable to measure the distance between a reference point and the interior surface of said vessel and to transmit signals relating to plural distance measurements to means for recording said signals, a video camera supported on said frame and operably connected to at least one of a monitor and recording means for providing video scanning of said surface, a positioner connected to said frame and to said video camera for positioning said video camera with respect to said frame to scan the interior surface of said vessel and floodlight means supported on said frame for illuminating said surface of said vessel for viewing by said video camera;

a positioner operable to interconnect said frame with a support for positioning said frame rotationally with respect to an axis of said vessel in a selected number of positions for measuring the distance from said reference point to said surface;

control means for moving said device along said axis of said vessel and for rotationally positioning said device in said vessel to scan a predetermined portion of said surface for making distance measurements between said surface and said reference point and for video scanning a predetermined area of said surface; and, an accelerometer means supported on said frame and operable to sense vibrations of said apparatus, said accelerometer means being operably connected to signal generating means for generating an alarm signal indicative of excessive vibration of said device during operation of said survey apparatus.

3. The system set forth in claim 2 wherein:

said camera positioner is operable to position said video camera about two mutually perpendicular axes, one of said axes coinciding with said axis of said vessel during operation of said device.

4. The system set forth in claim 2 including:

a clamp unit adapted to be supported on said vessel for clamping said support in a predetermined lateral and vertical position with respect to said axis of said vessel during operation of said device.

5. A method for inspecting the interior surface of a generally cylindrical petroleum coking drum comprising the steps of:

providing an inspection device including a survey apparatus for measuring the distance between a reference point with respect to a central longitudinal axis of said drum and the interior surface of a wall of said drum for locating one of bulges or distortions of said wall;

connecting said device to a support for moving said device along said axis within said drum;

positioning said device along said axis with said support;

determining the distance from said device to a predetermined point on said drum;

measuring the distances of a plurality of points between said surface and said reference point at a predetermined position of said survey apparatus in said drum;

rotating said device to another position about said axis and making measurements of the distances between said surface and said reference point of another plurality of points on said surface;

moving said survey apparatus along said axis and making measurements of the distances between said surface and said reference point of a still further plurality of points on said surface; and, sensing vibrations of said device and generating an alarm indicative of excessive vibration during operation of said device.

6. The method set forth in claim 5 including the step of:

plotting the measurements of said distances of substantially all of said plurality of points on said surface to provide a planar development of the interior surface of said drum.

7. The method set forth in claim 6 including the step of:

overlaying the plot of said plurality of points with a representation of a known anomaly of said surface of said drum.

* * * * *